SOLID STATE RADIATION DETECTORS

Original Filed Jan. 28, 1963 2 Sheets-Sheet 1

United States Patent Office 3,311,759

Patented Mar. 28, 1967

3,311,759
SOLID STATE RADIATION DETECTORS

Robert Lindsay Rouse, Reading, and James Wakefield, Woolhampton, England, assignors to Associated Electrical Industries Limited, London, England, a British company Continuation of abandoned application Ser. No. 254,272, Jan. 28, 1963. This application June 6, 1966, Ser. No. 555,614
Claims priority, application Great Britain, Feb. 2, 1962, 4,145/62
3 Claims. (Cl. 307—88.5)

This application is a continuation of Ser. No. 254,272, filed Jan. 28, 1963, now abandoned.

This invention relates to solid state radiation detectors.

It is known to use devices embodying a reverse biased p-n junction for the detection of charged particles. In operation the devices are exposed to the radiation and when charged particles penetrate the depletion zone in the region of the p-n junction ionisation occurs and a reverse current pulse passes through the devices indicating the radiation. By pulse height analysis energy spectroscopy can be carried out.

Whilst such detectors are perfectly suitable for charged particles they have hitherto been unsuited to the spectroscopy of gamma and X-rays.

For detection of this type of radiation a thicker depletion layer is required than is necessary for particle detection.

Moreover, X-rays and gamma rays produce secondary $\beta$ particles in the depletion zone to cause pulse conduction.

These $\beta$ particles are mainly produced as the result of three effects, (i) The Compton effect.
(ii) Photo-electric effect.
(iii) Pair production effects.

Since it is the energy of the secondary $\beta$ particles which determines the signal pulse height it is desirable that a single energy of secondary $\beta$ particle shall result from a single energy of incident gamma or X-ray. Whilst the second and third effects behave in this manner the first, i.e. the Compton, effect does not but gives readings over a wide energy band which makes spectroscopy difficult.

It is found, however, that the relative values of these effects varies with the atomic number of the semi-conductor material or materials forming the detector. With a material having a low atomic number the Compton effect predominates but with a material having a high atomic number the Compton effect is small compared with the photoelectric and pair production effects and this renders possible accurate spectroscopy.

The method of forming a p-i-n junction device according to the present invention consists in the steps of depositing a layer of lithium on the surface of a Group III–V semi-conductor compound one of the elements whereof has an atomic number greater than 32, heating the semi-conductor to cause the lithium to diffuse into the semi-conductor and form a p-n junction and then applying a reverse electrical bias to the junction at a lower temperature and for a sufficient length of time to produce the required thickness of depletion layer.

In compound semi-conductors it is possible to have atoms with a high atomic number and yet retain a large energy gap. Thus, in the case of the III–V compounds, the energy gap is always larger than that of the corresponding isoelectronic Group IV semi-conductor—for example, the energy gap in GaAs is 1.35 e.v., whereas in germanium it is only 0.72 e.v. It is therefore possible to use such compounds as gamma and X-ray spectrometers operating at higher temperatures than for germanium.

The behaviour of Li, as a donor impurity with a high diffusion rate makes it suitable for use in producing wide p-n junctions in III–V compounds as in germanium and silicon. Such p-n junctions could, for example, be used for $\gamma$-Ray spectrometers without the need for cooling.

A further advantage in the use of III–V compounds is that if the constituent elements are of widely differing atomic number, the magnitude of the photoelectric and pair production peaks relative to the Compton effect depends almost entirely on the atom with the higher atomic number, since the relative magnitude of the photo-electric peak increases very rapidly with increasing atomic number, and this greatly outweighs the fact that only half the atoms have this high atomic number. Therefore, the photo-electric peak is larger compared with the Compton effect than is the case for a single element such as germanium: also, the device should not need cooling.

Suitable materials should be AlSb (Sb, $Z=51$, energy gap=1.65 e.v.) or InP (In, $Z=49$, energy gap=1.25 e.v.).

According to a further feature the invention comprises a reverse biased p-n junction in a III–V compound, with $E_g$ greater than for germanium, and with a constituent atom having a higher atomic number than germanium, prepared by the Li drift technique to act as a radiation detector.

Examples of the applications of such detectors are to $\gamma$-ray and X-ray spectrometers.

The p-n junction may be formed by a process in which a layer of lithium is first deposited on the surface of the semi-conductor. This lithium may be deposited by means of vacuum evaporation.

Preferably a layer of lithium is deposited on the surface of the semi-conductor which is then heated to cause the lithium to diffuse into the semiconductor and form a p–n junction.

A reverse bias would then be applied to the junction at a lower temperature and for a sufficient length of time to produce the requisite thickness of depletion layer.

The invention also comprises a solid state radiation detector including a p–i–n junction formed in a semiconductor III–V compound with Eg greater than for germanium and with a constituent atom having a higher atomic number than germanium together with contacts or leads for attachment to an electrical biasing and measuring circuit, and where necessary means for cooling the semi-conductor material.

Preferably the device is encapsulated and sealed in an inert atmosphere or vacuum or alternatively is continuously pumped. The device may be cooled if necessary by attaching it to a heat sink, e.g. a metal block which is cooled, e.g. liquid cooled.

In order that the invention may be more clearly understood reference will now be made to the accompanying drawings, in which.

Figure 1A:
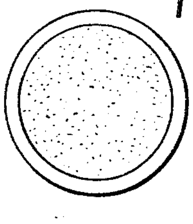
FIG. 1A shows a plan view of an initial semi-conductor wafer.
Figure 1B:
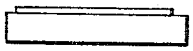
FIG. 1B is an elevation of the wafer shown in FIG. 1A.

According to a preferred method a p–n junction is first prepared in a circular wafer of p-type semiconductor as shown in FIG. 1. A circular patch of lithium about 1.5 centimetres in diameter is evaporated on to one face of the wafer in a vacuum evaporation plant. The film of lithium is indicated by the shading in FIG. 1A and preferably has a thickness of 1 micron. Without removing the wafer from the vacuum in the evaporation plant a layer of aluminum is evaporated on to the lithium by any suitable known process to prevent oxidation of the lithium when it is removed from the evaporation plant.

Figure 2:
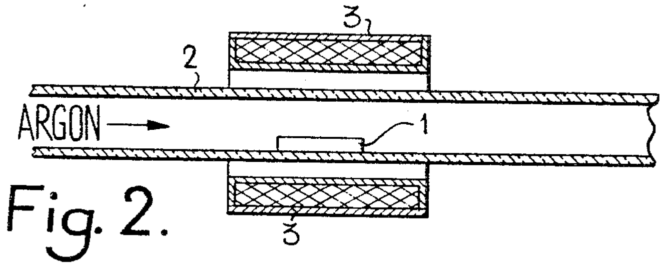
FIG. 2 shows diagrammatically the heating device to form a p–n junction by lithium diffusion.
Figure 3:
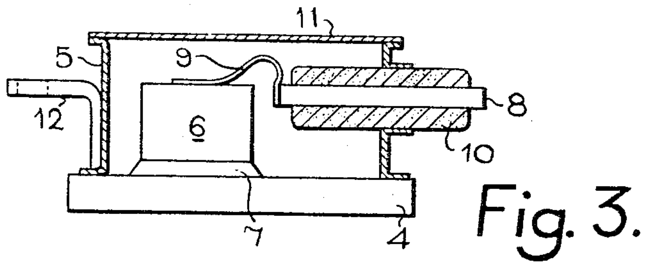
FIG. 3 is a vertical sectional view of the canned device.
Figure 4:
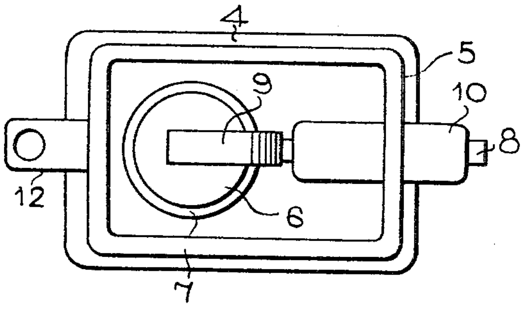
FIG. 4 is a plan view of the device with the top cover removed.
Figure 5:
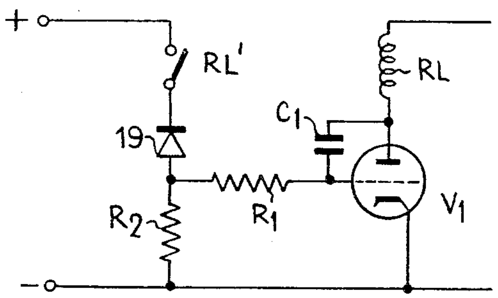
FIG. 5 is an electrical circuit arrangement suitable for carrying out the drift operation.

As shown diagrammatically in FIG. 2, the semi-conductor wafer is then heated to a temperature which is high enough for the Li to diffuse into the semi-conductor and which may be about 400° C. in an inert atmosphere by placing it in a silica tube 2 through which argon gas is flowing. The heating may be by means of an electrical tubular furnace indicated by the reference 3. The heating is continued for a few minutes during which times the lithium diffuses into the semi-conductor by the normal thermal diffusion process. The diffusion should extend to a distance of about 300 to 500 microns. Since the lithium is a donor impurity a p–n junction is formed in the p-type semiconductor. This slice with the p–n junction formed in it is now mounted in a can as shown in FIGS. 3 and 4. The can may be formed of a copper base plate 4 to which is attached a thin rectangular copper side wall 5 which is welded to the base plate. The semi-conductor 6 is mounted on a raised copper spigot 7 attached to the base plate and which also serves as a means for making contact to the p-type side of the semi-conductor by means of the contact arm 12. Contact may be made to the n-type side by means of the copper rod 8 with a leaf spring connection 9. The copper rod 8 is carried through the can wall by means of the insulating ceramic bush 10. The can is filled with an inert gas such as dry argon or dry air or evacuated and then closed by means of a thin plate 11 which is preferably aluminium or some other low density material. The junction is now "drifted" by an ion drift process to give a p–i–n structure. When it is at an elevated temperature a reverse bias is applied to the junction and the depletion area slowly decreases in thickness. At this time it is important to avoid thermal runaway. It will be appreciated that if the reverse current rises at a given temperature and reverse voltage (as it will do when the depletion area increases in thickness, the current being proportional to the thickness for large regions), extra power is dissipated. The temperature and thus the reverse current in the depletion area will rise still further and the system may become unstable and run away. In order to avoid this thermal run-away FIG. 5 shows a circuit for providing current limitation. In FIG. 5 the specimen indicated at 19 is connected in series with a resistor $R_2$ and relay contacts RL′ across + and − supply terminals of a D.C. supply which will normally be about 500 volts so that the D.C. voltage will be applied in reverse across the p–n junction. The voltage developed across $R_2$ is applied through a resistor $R_1$ to the grid of a valve $V_1$ which has a relay coil RL in its anode circuit and a capacitor $C_1$ connected between its anode and grid so that it acts as a Miller Integrator. Initially the relay contacts RL′ are closed and the reverse D.C. voltage across the p–n junction causes the junction to start to run away and hence the current increases. Increasing volts appear across the resistance $R_2$ applying a larger input voltage to the valve $V_1$, the Miller Integrator has the property that $$Vo=\frac{-1}{R_1C_1}\int Vidt+\text{constant.}$$

As the voltage across $R_2$ increases the anode cathode voltage of the valve drops and the relay coil takes more current until the contacts RL′ open. The voltage across $R_2$ is now zero so that the current in the relay coil RL drops and the contacts again close. Thus the average current is held constant and the average power dissipated in the device held constant.

The time required to "drift" a given thickness is proportional to $(Pt)^{1/2}$ where P is the power dissipated in the device and $t$ the time of "drift." The lifetime too of the material also affects the rate of "drift."

After "drifting" the device may need a chemical etch to remove contamination from the surface, in order that the reverse current of the device is reduced to a minimum. The device is now ready for use. The reverse current of the junction should be less than $10^{-8}$ amps and noise from this current is negligible.

Figure 6:
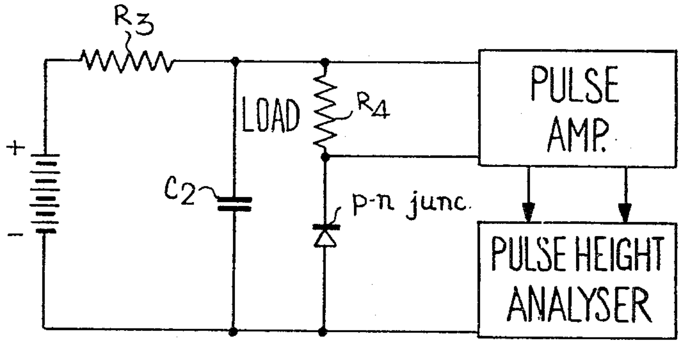
FIG. 6 shows in block form the arrangement of the device in use as a $\gamma$-ray spectrometer.

The device is connected in the circuit as shown in FIG. 6. Charge pulses in the p–i–n junction caused by the gamma rays are amplified by a low noise pulse amplifier and analysed by a pulse height analyser. Normal bias and load resistor values are about 50 volts and 50 megohms respectively.

We claim:

1. A solid state radiation detector for detecting gamma rays and X-rays comprisig a member formed of a Group III–V semi-conductor compound wherein one of the elements of the compound has an atomic number of at least 49 and the other element has an atomic number less than 32, said member including a PIN junction means applying a reverse electrical bias across said junction forming a wide depletion region so that gamma rays and X-rays received in the depletion region produce $\beta$ particles in the depletion region which $\beta$ particles cause a signal pulse to be created in the detector, the elemental composition of said compound causing the production of $\beta$ particles to be predominantly the result of the pair production effect and the photoelectric effect while the Compton effect is relatively small, pulse analyzing means for analyzing the pulse created by the $\beta$ particles, and means electrically connecting said member to said pulse analyzing means.

2. A detector as claimed in claim 1 wherein said compound is formed of aluminum and antimony.

3. A detector as claimed in claim 1 wherein said compound is formed of indium and phosphorous.

References Cited by the Examiner

UNITED STATES PATENTS

| | | | |
|---|---|---|---|
| 2,725,315 | 11/1955 | Fuller | 317—235 |
| 2,819,990 | 1/1958 | Fuller et al. | 317—235 |
| 2,857,527 | 10/1958 | Pankove | 317—235 |
| 2,908,871 | 10/1959 | McKay | 317—235 |
| 2,988,639 | 6/1961 | Welker et al. | 250—83.3 |
| 3,102,201 | 8/1963 | Brawnstein et al. | 317—235 |
| 3,110,806 | 11/1963 | Denney et al. | 317—235 |
| 3,225,198 | 12/1965 | Mayer | 317—235 |

JOHN W. HUCKERT, *Primary Examiner.*

J. D. CRAIG, *Assistant Examiner.*